United States Patent [19]

Musschoot

[11] E Re. 29,512

[45] Reissued Jan. 10, 1978

[54] VIBRATORY MATERIAL HANDLING DEVICE WITH VARIABLE FORCE

[75] Inventor: Albert Musschoot, Barrington, Ill.

[73] Assignee: General Kinematics Corporation, Barrington, Ill.

[21] Appl. No.: 556,179

[22] Filed: Mar. 6, 1975

Related U.S. Patent Documents

Reissue of:

[64] Patent No.: 3,796,299
Issued: Mar. 12, 1974
Appl. No.: 160,679
Filed: July 8, 1971

[51] Int. Cl.[2] ..... B65G 27/00

[52] U.S. Cl. ..... 198/770

[58] Field of Search ..... 198/220 A, 220 BA, 220 DB, 198/76, 110, 770; 74/61, 87; 209/325, 326, 329, 341, 365, 366, 366.5, 367

[56] References Cited

U.S. PATENT DOCUMENTS

| | | | |
|---|---|---|---|
| 2,200,724 | 5/1940 | Robins | 198/220 DB X |
| 2,312,477 | 3/1943 | Pollitz | 209/329 |
| 3,014,587 | 12/1961 | Philippovic | 209/366.5 |
| 3,053,379 | 9/1962 | Roder | 198/220 DB |
| 3,226,989 | 1/1966 | Robins | 198/220 DB |
| 3,342,075 | 9/1967 | Lowe | 74/61 |
| 3,346,097 | 10/1967 | Carrier | 198/220 DB |
| 3,468,418 | 9/1969 | Renner | 198/220 A |
| 3,648,862 | 3/1972 | Sugimoto | 198/220 DB X |
| 3,687,420 | 8/1972 | Schweinfurth et al. | 198/220 DB |

FOREIGN PATENT DOCUMENTS

| | | | |
|---|---|---|---|
| 62,136 | 6/1955 | France | 209/367 |

*Primary Examiner*—Evon C. Blunk
*Assistant Examiner*—Joseph E. Valenza
*Attorney, Agent, or Firm*—Wegner, Stellman, McCord, Wiles & Wood

[57] ABSTRACT

An apparatus for performing work on material through vibration. An elongated material receiving surface is provided along with a mount for the same that permits the surface to be vibrated. A vibrating mechanism including two spaced vibratory force generating devices may be adjustably secured to the material receiving surface in any of a variety of positions with respect to the center of gravity of the latter so that the direction of the vibratory force applied to the material receiving surface may be varied.

3 Claims, 6 Drawing Figures

Inventor:-
Albert Musschoot,
By Hofgren, Wegner, Allen, Stellman & McCord Attys.

VIBRATORY MATERIAL HANDLING DEVICE WITH VARIABLE FORCE

Matter enclosed in heavy brackets [ ] appears in the original patent but forms no part of this reissue specification; matter printed in italics indicates the additions made by reissue.

BACKGROUND OF THE INVENTION

This invention relates to material handling vibratory devices such as material classifiers or vibratory conveyors.

Oftentimes, material handling vibratory devices are called upon to handle different types of material having different characteristics which must be compensated for in a vibratory driving mechanism to insure proper handling. In such cases, rather severe adjustments have had to be made to a system when the same is to operate on a different material from that on which it was previously operating. The adjustments are often time consuming, and in some cases, rather intricate and thus there is a very real need for a vibratory, material handling device that may be easily adjusted to accommodate different materials having different handling characteristics or which may be adjusted to handle a single material in different ways as exigencies of a particular situation may require.

SUMMARY OF THE INVENTION

It is the principal object of the invention to provide a new and improved vibratory material handling device which may be easily adjusted to change the vibratory forces applied to a material handling device to accommodate different materials or different types of treatment of the same material.

The exemplary embodiment of the invention achieves the foregoing object by means of a construction including a material handling device including a material receiving surface mounted for vibratory movement to be imparted thereto by a vibrating means. According to the preferred embodiment, a vibrating means in the form of a pair of independent, spaced, vibratory force imparting means is employed and means are provided whereby the vibratory device may be connected to the material handling device at a variety of different locations without changing the attitude of the former with respect to the latter for ease of adjustment. According to one embodiment, the vibratory force generating devices comprise rotary motors driving eccentric weights about spaced, but parallel axes. By changing the location of the vibratory mechanism with respect to the center of gravity of the material handling device, the direction of application of vibratory force may be altered and chosen to accommodate various handling characteristics of different materials or to provide different types of material handling for a single type of material.

Other objects and advantages will become apparent from the following specification taken in conjunction with the accompanying drawings.

DESCRIPTION OF THE PREFERRED EMBODIMENT

Before entering a detailed discussion of structure employed in the invention, to assist in understanding the invention, it should be observed that it has been discovered by the applicant that the direction of force application to a material handling device by a vibratory mechanism of a particular type can be altered by changing the position of the vibratory device relative to the material handling device and specifically, the center of gravity of the latter.

As is generally alluded to in the preceding paragraph, a particular type of vibratory device is required and specifically, one that generates bi-directional vibratory forces at two spaced points. The direction of application of force to the material handling device will then be along a line drawn between the mid-point of a line extending between the two points of force generation and the center of gravity of the material handling device. Thus, by moving the position of a vibratory mechanism of the character mentioned with respect to the center of gravity of a material handling device, the direction of application of force to the material handling device can be varied.

This phenomenon can be used to change the conveying direction of a vibratory conveyor, the rate of conveying in a particular direction or, in the case of a particle classifier, the magnitude of vibratory motion imparted to the material being classified.

Figure 1:
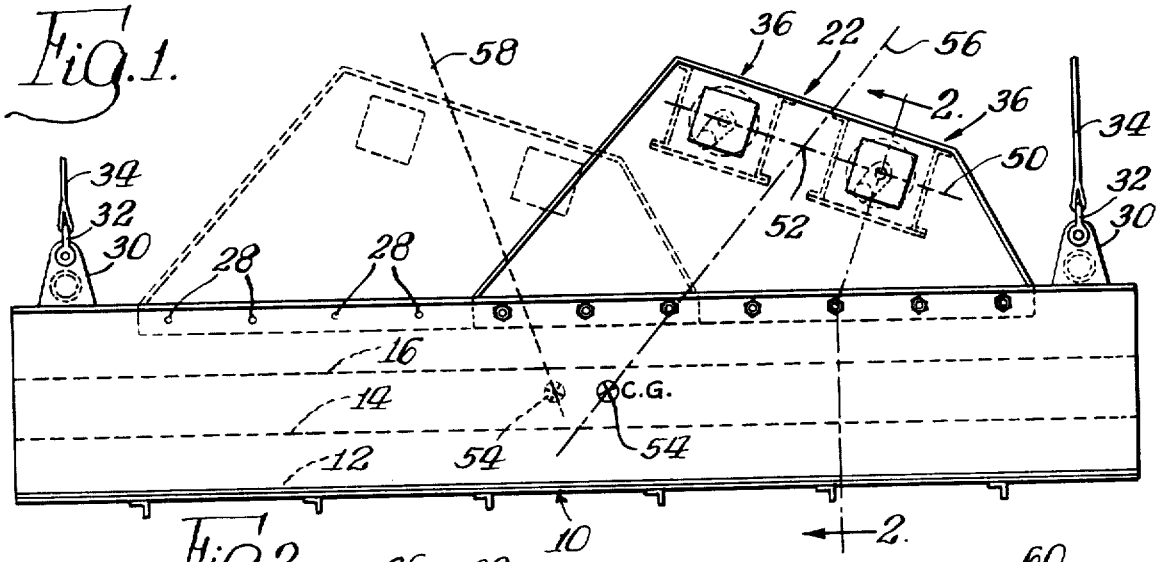
FIG. 1 is a side elevation of a vibratory material handling device made according to the invention.
Figure 2:
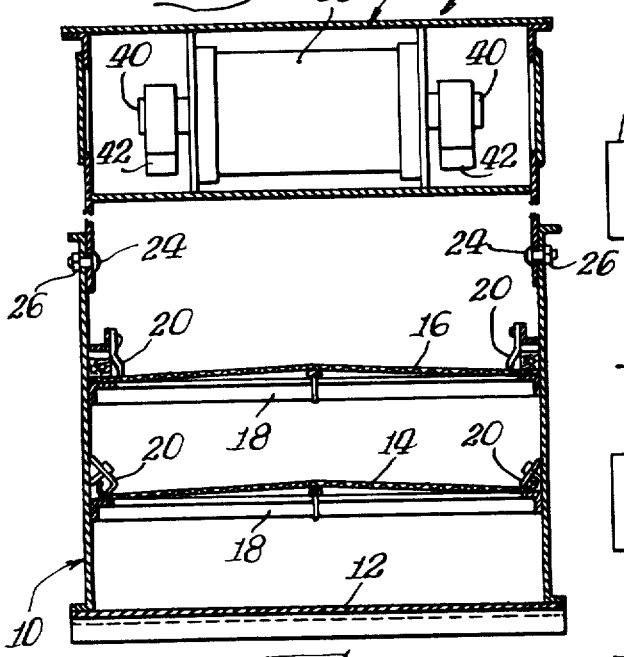
FIG. 2 is a substantially vertical section taken approximately along the line 2—2 of FIG. 1.

One form of an apparatus embodying the foregoing principle as illustrated in the drawings and with reference to FIGS. 1 and 2 is seen to include a trough-like member generally designated 10 having an imperforate bottom 12 and upwardly spaced classifying screens 14 and 16. The screens 14 and 16 are secured in their spaced relation as illustrated in FIG. 2 by cross members 18 and screen retaining brackets 20, neither of which form a part of the instant invention.

At the upper end of the trough-like member 10, a vibratory mechanism, generally designated 22 is mounted by means of bolts 24 and nuts 26 extending through apertures 28 in the upper side walls of the trough-like member 10. As illustrated in FIG. 1, a greater number of the apertures 28 are provided than are necessary for securing the vibrating mechanism 22 to the trough-like member 10 so that the position of the former with respect to the latter may be selectively varied.

The trough-like member 10 is mounted for vibratory movement by means of upstanding ears 30 mounting eyelets 32 for receipt of suspenditory cables 34.

Figure 3:
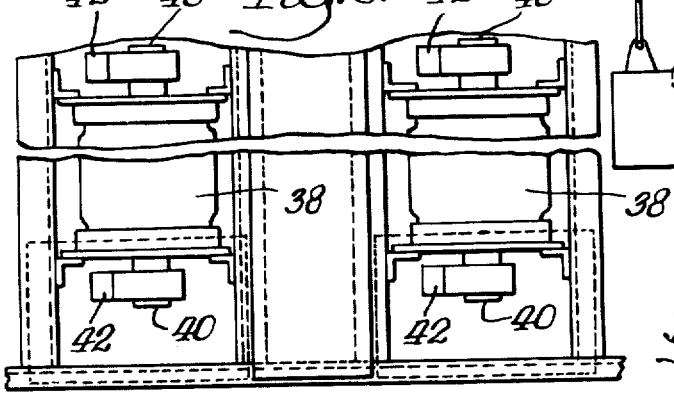
FIG. 3 is a view of the vibratory mechanism employed.

The vibratory mechanism 22 comprises a pair of spaced vibratory devices, each generally designated 36. As can be observed in FIGS. 2 and 3, each vibratory device 36 comprises an electric motor 38 having a rotary output shaft with opposed ends 40, each eccentrically mounting weights 42. According to the preferred embodiment, there is no connection between the motors 38 such as an electrical or a mechanical connection. Such is not necessary for in operation it has been found that the two motors will tend to synchronize with each other at the same speed. Preferably, the direction of rotation of the output shafts of the motors 38 is opposite so that only a bi-directional total force will be applied to the material handling device in the form of the trough-like member 10, sideways forces cancelling out by reason of the opposite direction of rotation of the weights 42.

Normally, with such a system, one would believe that the direction of force application would be perpendicular to a plane 50 encompassing the parallel shafts 40 of the motors 38. However, as mentioned previously, it has been found that the direction of force application is actually along a line extending from a point 52 midway between the shafts 40 on the plane 50 and the center of gravity 54 of the material handling device. As a result, when the vibratory mechanism 22 is in the positions shown in solid line in FIG. 1, force will be applied in the direction of the line 56. If the vibratory mechanism 22 is moved to the position illustrated in dotted lines in FIG. 1, the direction of force application will be represented by a line 58. The shift in the position of the center of gravity is, of course, due to the change in location of the vibratory mechanism which is rigidly secured to the material handling device.

Figure 4:
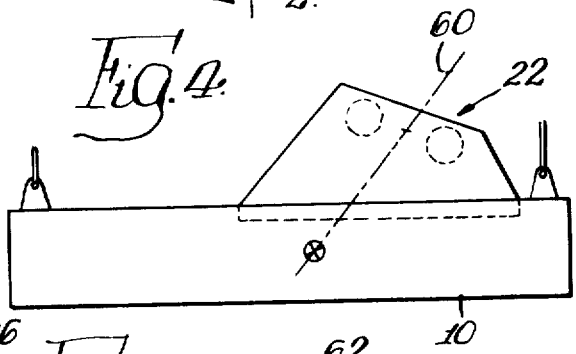
FIG. 4 is a schematic illustrating the direction of vibratory force application for one position of the vibratory mechanism relative to the material handling device.
Figure 5:
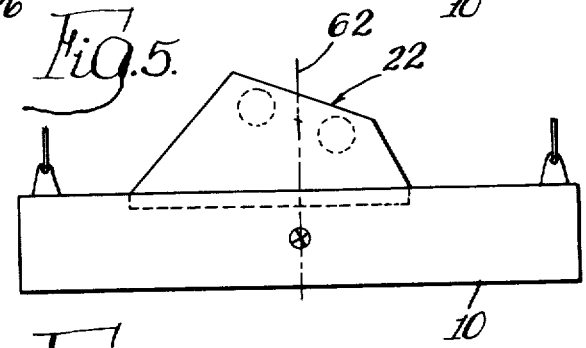
FIG. 5 illustrates another direction of force application for another position location of the vibratory mechanism with respect to the material handling device.
Figure 6:
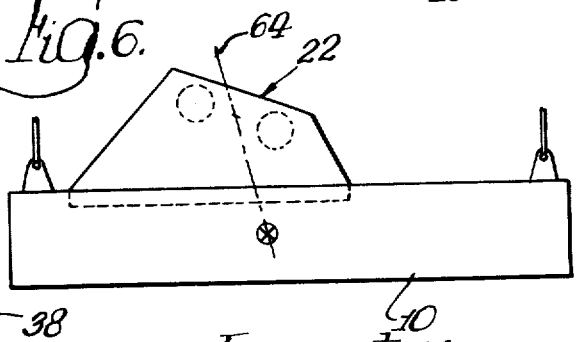
FIG. 6 illustrates yet another direction of vibratory force application for still another location of the vibratory mechanism with respect to the material handling device.

FIGS. 4–6, inclusive, illustrate various orientations that may be achieved, all without changing the attitude of the vibratory mechanism 22 with respect to the troughlike material handling device 10. In FIG. 4, force will be applied along the line 60 which would result in material being conveyed toward the right at a relatively rapid rate. In FIG. 5, no conveying action would be present. Rather, the material would be vibrated in a vertical direction represented by the line 62. In FIG. 6, a slow conveying rate toward the left would prevail by reason of force application along the line 64.

As a result of the foregoing construction, it will be appreciated that material conveying rates may alter according to the invention or, if desired, the same may be used for pure classification purposes. One particular advantage to this application is for combination classifying and conveying. By appropriately positioning the vibratory mechanism with respect to the trough-like member 10, conveying action may be obtained with material residence time sufficient to insure full and complete classification.

Thus, by movement of appropriate vibratory force generating means with respect to the center of gravity of the material handling device, either by translation as specifically disclosed, rotation (so long as the rotation is not about an axis coinciding with the point 52) or combinations thereof, the direction of force application to the material handling device can be selectively varied.

And it will be appreciated that the foregoing features and advantages may all be obtained while minimizing time consuming adjustments, it merely being necessary to remove the bolts securing the vibrating mechanism 22 to the trough-like member 10, shift the latter and reconnect the same; and no expensive equipment for varying the speed of the motors or for varying the tuning of resilient spring systems or the like is required.

I claim:

1. A vibratory material handling device comprising: means defining an elongated surface adapted to carry material to be worked upon; a pair of parallel walls on either side of said surface and extending in the direction of elongation thereof; a vibratory mechanism including a frame, a pair of spaced parallel shafts rotatably mounted in the frame and extending transversely of the direction of elongation of the material carrying surface, an eccentric weight at each end of each shaft, means for rotating one of said shafts, independent means for rotating the other of said shafts, said frame carrying said shafts and rotating means in fixed position relative to each other; means mounting said material carrying surface for vibratory movement, means on said walls defining a guide path therealong and providing means for securing the vibratory mechanism thereto; and means for selectively fastening said vibratory mechanism to said securing means at varying points spaced along the guide path to locate the mid-point of a line joining said shafts in a first position on one side of the center of gravity of the device, in a second position where the mid-point is vertically aligned with the center of gravity of said device, and in a third position where said mid-point is on the other side of the center of gravity, whereby to cause said device to convey material thereon in one direction when the vibratory mechanism is in said first position, in the opposite direction when the vibratory mechanism is in the third position, and to vibrate material without conveying the same when the vibratory mechanism is in the second position.

*2. A vibratory material handling device comprising: means defining an elongated surface adapted to carry material to be worked upon; a pair of parallel walls on either side of said surface and extending in the direction of elongation thereof; a vibratory mechanism including a frame, a pair of spaced parallel shafts rotatably mounted in the frame and extending transversely of the direction of elongation of the material carrying surface and parallel to said surface, an eccentric weight carried by each shaft, means for rotating one of said shafts, independent means for rotating the other of said shafts, said frame carrying said shafts and rotating means in fixed position relative to each other; means mounting said material carrying surface for vibratory movement; and means for securing the vibratory mechanism to the material-carrying member in a position whereby a line intersecting the plane in which the parallel shafts lie at a point midway between said shafts and passing through the center of gravity of the device intersects said plane at an obtuse angle, the means for rotating said shafts permitting the shafts to self-adjust to direct vibratory force along said line.*

*3. A vibratory material handling device comprising: means defining an elongated surface adapted to carry material to be worked upon; a pair of parallel walls on either side of said surface and extending in the direction of elongation thereof; a vibratory mechanism including a frame, a pair of spaced parallel shafts rotatably mounted in the frame and extending transversely of the direction of elongation of the material carrying surface and parallel to said surface, an eccentric weight carried by each shaft, means for rotating one of said shafts, independent means for rotating the other of said shafts, said frame carrying said shafts and rotating means in fixed position relative to each other; means mounting said material carrying surface for vibratory movement; and means for securing the vibra-*

*tory mechanism to the material-carrying member in a position whereby a line intersecting the plane in which the parallel shafts lie at a point midway between said shafts and passing through the center of gravity of the device intersects said plane at an acute angle, the means for rotating said shafts permitting the shafts to self-adjust to direct vibratory force along said line.*

* * * * *